United States Patent
Li

(10) Patent No.: US 6,600,415 B1
(45) Date of Patent: Jul. 29, 2003

(54) EMERGENCY-DECELERATION CONDITION TRANSDUCER, CONTROLLING CIRCUIT FOR EMERGENCY-DECELERATION CONDITION SIGNAL, AND EMERGENCY BRAKE LAMP

(75) Inventor: Jiekui Li, No. 2, Unit 5, Building 41, Ruhexiaoqu, Zhengzhou City, Henan Province 450006 (CN)

(73) Assignee: Jiekui Li, Zhengzhou (CN)

( * ) Notice: Subject to any disclaimer, the term of this patent is extended or adjusted under 35 U.S.C. 154(b) by 0 days.

(21) Appl. No.: 09/937,750

(22) PCT Filed: Sep. 4, 1998

(86) PCT No.: PCT/CN98/00182

§ 371 (c)(1),
(2), (4) Date: Sep. 28, 2001

(87) PCT Pub. No.: WO00/14550

PCT Pub. Date: Mar. 16, 2000

(51) Int. Cl.[7] .................................................. B60Q 1/50
(52) U.S. Cl. ........................ 340/467; 340/463; 340/471; 340/479
(58) Field of Search ................................. 340/463, 464, 340/466, 467, 471, 472, 479, 468

(56) References Cited

U.S. PATENT DOCUMENTS

| | | | |
|---|---|---|---|
| 3,593,278 A | * 7/1971 | Bower | 340/72 |
| 3,847,447 A | * 11/1974 | Needham et al. | 303/21 |
| 3,955,398 A | 5/1976 | Watson et al. | |
| 4,667,177 A | * 5/1987 | Athalye | 340/71 |
| 4,920,330 A | * 4/1990 | Plozner | 340/467 |
| 5,089,805 A | * 2/1992 | Salsman | 340/467 |
| 5,404,130 A | * 4/1995 | Lee et al. | 340/479 |
| 5,565,841 A | * 10/1996 | Pandohie | 340/479 |
| 5,786,753 A | * 7/1998 | Craig et al. | 340/467 |
| 6,225,896 B1 | * 5/2001 | Sendowski | 340/467 |

FOREIGN PATENT DOCUMENTS

| | | | |
|---|---|---|---|
| DE | 4236328 | 9/1993 | G01C/9/08 |
| EP | 0 299 933 | 1/1989 | H01H/29/00 |
| GB | 2 066 398 | 12/1979 | G01P/15/135 |

* cited by examiner

Primary Examiner—Daniel J. Wu
Assistant Examiner—Son Tang
(74) Attorney, Agent, or Firm—Pennie & Edmonds LLP

(57) ABSTRACT

The invention relates to emergency-deceleration condition transducers, including an insulation house made by insulation material, which defines a closed arc hollow groove. Said arc hollow groove is filled with some mercury. Said mercury in the arc groove will be moved for front and behind along the arc surface when the traveling speed is changed during the motor vehicle travailing, so that the electrodes spaced will be turned on/turned off to produce corresponding condition signal. The invention relates still to emergency brake lamps using the emergency-deceleration condition transducers, the turning on/off of the lamps will be carried out automatically without effects by driver mistaking operating, so the accident of vehicle striking from behind can be effectively avoided.

22 Claims, 5 Drawing Sheets

FIG.2

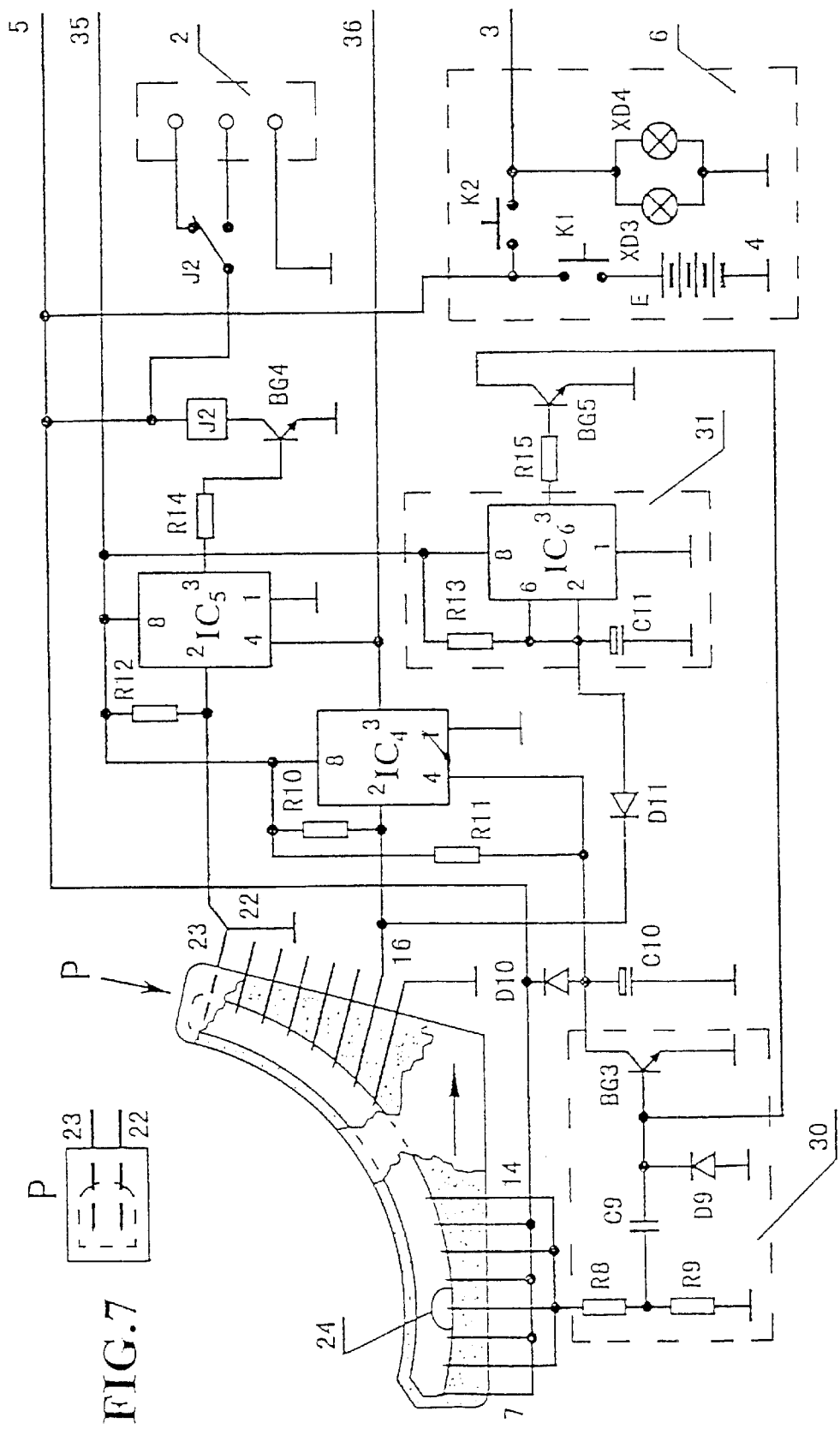

EMERGENCY-DECELERATION CONDITION TRANSDUCER, CONTROLLING CIRCUIT FOR EMERGENCY-DECELERATION CONDITION SIGNAL, AND EMERGENCY BRAKE LAMP

FIELD OF INVENTION

The invention relates to a vehicle safe traveling alarm device, and particularly, to a transducer and a signal control circuit for an emergency-deceleration condition, and an emergency brake lamp using said transducer and signal control circuit.

BACKGROUND OF INVENTION

At present, deceleration alarm signals of all automobiles in the world are produced artificially by the driver's brake action. Since it is impossible to identify whether normal deceleration or emergency brake signals are indicated by the tail lamps, an accident of vehicle striking from behind is extremely liable to occur, or even a chain of vehicle striking accidents are caused.

In general cases, drivers do not activate emergency brakes purposelessly unless they are at a critical moment or in a last resort. However, unexpected events, particularly mechanical troubles, such as tire sudden explosion, engine rotating section damage and blocking etc., involuntarily occur to drivers. Since such events are not caused artificially, emergency breaking down occurs without starting the brake tail lamps, and likely causes accidents of vehicle striking from behind. Particularly for expressways, once accidents of vehicle striking from behind occur due to unexpected events, the drivers must be injured, suffer shock, or even be killed without issuing accident signals. At this time, if the other drivers following do not attentively focus on driving or there is a poor visibility, further striking accidents would be resulted, or even similar accidents cyclically occur like chain actions.

On Nov. 29, 1991, a chain of serious vehicle striking accidents occurred in California, US, 17 people were killed and 157 injured. On Nov. 6, 1990, many vehicles collided in Holland, 10 people were killed and dozens injured. On Feb. 27, 1991, more than 100 vehicles collided in France, 4 people were killed, and 20 injured and 12 seriously injured. And also in France, above 140 vehicles had collided before, and heavy casualties suffered. On Nov. 31, 1991, about 80 vehicles collided in California, US, 12 people were killed and many injured. And also in California, US, three accidents occurred on Jan. 15, 1994, in which above 60 vehicles collided, 2 people were killed, and above 50 injured. On Feb. 27, 1991, above 100 vehicles collided in Belgium, 23 people were injured and 2 killed. On Feb. 26, 1998, above 140 vehicles collided on Beinjing-Tianxin-Tangshan expressway in China, and traffic was interrupted seriously. On Mar. 10, 1998, 98 vehicles collided on expressway No. 31 in the North of France, 53 people were injured, and 8 seriously injured. In addition, serious vehicle accidents have occurred also in following countries: Italy, Britain, former Soviet Union, Japan, Germany, and nearly all developed or developing countries. Among them, Italy's most serious accident occurred on Feb. 10, 1993, in which several hundreds vehicles collided, 8 people were killed, the injured and seriously injured were up to 107, serious economic losses were caused, and traffic was blocked for a long time. On the day before, also in Italy, a similar serious event occurred, in which 5 people were killed, and above 100 injured. In China, only in Henan Province, 13317 road traffic accidents occurred in 1997, and 3513 people were killed, which means that every day 37 accidents would occur, 10 people were killed, and 28 injured, among them the accidents of vehicle striking from behind occupying a considerable proportion, published by "Da He (great river) Daily", on Mar. 13, 1998.

It is illustrated from above instances and references that whether expressways or roads, heavy or light accidents of vehicle striking from behind occur sometimes, less as two or three vehicles, more as several hundreds vehicles.

Such serious results are caused by following reasons, the first reason is: the following drivers are warned only by artificially manipulating the brake tail lamps, which can not satisfy the need of modern vehicle traveling, but the actual effects of such brake tail lamps are over-believed.

Second, such brake tail lamps can not tell normal deceleration from emergency brake, and the following drivers would realize the risks too late.

Third, the warning effects of such brake tail lamps are not ideal, particularly when there is a poor visibility or the driver do not attentively focus on driving; and measures can not taken in time even finding the risk quickly.

Therefore, governments have stipulated that for any breaking down vehicles on the way, a warning or sign board must be set about one hundred meter away from their parking site so as to prevent a serious accident from occurring. However, such action needs a long preparing and carrying out process. It is obvious that there is no time to respond the accident on a heavy traffic expressway, and in this case, following collision would occur in several seconds or dozens of seconds.

Therefore, in Japan, a safe airbag is designed for and added to the steering wheel in cooperation with a safe belt in order to reduce the effects of the vehicle collision on the personnel. But the fact is that only the drivers are protected in a certain degree and that for passenger, particularly for vehicles themselves, there is little significance. Particularly for the earlier collided vehicle and the passenger in it, any effective result and protection are not obtained, and the earlier collided vehicle in turns become another collision target. Thus, it is obvious that such airbag is not the best means to solve the collision problem, and the active method to remedy and control the situation.

In order to solve the vehicle collision problem, scientists in various countries have made attempts to prevent collision by a method in which an active brake is performed with a distance-measuring radar using ultrasonic wave, infrared ray, electromagnetic wave, laser etc. But that method needs expensive instruments mounted (proportional to performance). Furthermore, that method requires to improve and add complex electronic brake devices, and its fatal disadvantage is that traffic accidents are more liable to be caused (a near-distance dodging of flying birds, insects, bats, tree leaves, and falling paper sheets can result in strange emergency braking), and that groundless troubles are brought, or even a chain collisions are caused. Therefore, such envisage and scheme has remained in test stage and no substantial progress is made since the appearance of expressway.

SUMMARY OF INVENTION

An object of the invention is to provide an emergency-deceleration condition transducer, which can detect vehicle traveling conditions, such as normal traveling, emergency-deceleration, vehicle collision, or even an overturn accident.

Another object of the invention is to provide a signal control circuit which is used cooperatively with the emergency-deceleration transducer.

A further object of the invention is to provide an emergency brake lamp which can automatically detect vehicle traveling conditions and issues effectively a corresponding warning signal when vehicle emergency-deceleration or vehicle collision or even overturn accidents occurs.

In order to achieve the objects described above, the invention provides a emergency-deceleration condition transducer including an insulate house made of an insulate material, in which a close hollow arc groove is formed, said arc groove having an arc surface; some mercury is injected into said arc groove and changing with the vehicle traveling speed, said mercury in the arc groove would freely move backwards and forwards along the arc surface; a plurality of metal contacts are provided on the said arc surface and led outside of said housing as leading out electrodes, the adjacent metal contacts are turned on and off successively when the mercury moves from one end contact to the other.

The length of the arc groove of the emergency-deceleration condition transducer described above is about 8–35 times of the length of the mercury along the longitudinal direction of the arc groove, and preferably 13 times.

The metal contacts in the emergency-deceleration condition transducer described above are preferably arranged successively along the extension direction of the arc groove, in a single column, in double columns, or alternatively in single column and in double columns, and more preferably in a single column.

The metal contacts in the emergency-deceleration condition transducer described above may be also arranged successively in multi-columns along the extension direction of the arc groove.

The number of the metal contacts in the emergency-deceleration condition transducer described above, when arranged successively in single column, is selected as 4–36, and preferably as 17.

The arc surface of the arc groove in the emergency-deceleration condition transducer described above should be set higher in front and lower in rear to the vehicle traveling direction, and a connection line between the highest metal contact and the lowest contact on the arc surface has a incline angle of 15–60 degree to the vehicle traveling direction, and preferably 40 degree.

Said a plurality of metal contacts, according to their different positions on the arc surface of the arc groove , are divided into a normal traveling detection section, whose corresponding contacts send a on-off signal when the vehicle is normally traveling; an emergency braking detection section, whose corresponding contacts are turned on momentarily when emergency braking is applied; and a collision detection section, whose corresponding contacts are turned on momentarily when a vehicle collision accident occurs, and are continuously kept on turning on state when an overturn accident occurs.

The collision detection section in the emergency-deceleration condition transducer described above includes at least two contacts, which are continuously kept in a turning on state by the mercury when an overturn accident occurs.

The invention further provides an emergency-deceleration condition signal control circuit including an emergency-deceleration condition transducer provided with: an insulate house made of an insulate material, in which a close hollow arc groove is formed, said arc groove having an arc surface; some mercury is injected into said arc groove and changing with the vehicle traveling speed, said mercury in the arc groove can freely move along the arc surface; a plurality of metal contacts are provided on the said arc surface and led outside of said housing as leading out electrodes, the adjacent metal contacts being turned on and off successively when the mercury moves from one end contact to the other. A plurality of said metal contacts, according to their different positions on the arc surface in the arc groove, are divided into a normal traveling detection section, whose corresponding contacts send a on-off signal when the vehicle is normally traveling; an emergency braking detection section, whose corresponding contacts are turned on momentarily when emergency braking is applied; and a collision detection section, whose corresponding contacts are turned on momentarily when a vehicle collision accident occurs, and are continuously kept in a turning on state when an overturn accident occurs. The emergency-deceleration condition signal control circuit also includes: a first flip-flop circuit for receiving a pulse output signal from the emergency braking detection section of said transducer, and for being flipped to output the emergency braking condition information when the pulse signal is detected; a second flip-flop circuit for receiving a output signal from the collision detection section of said transducer, and for being flipped to output the collision or overturn information when a collision or overturn signal is detected; a time delay circuit for locking, after the first or second flip-flop circuit is flipped, the state for a predetermined time; and a pulse generating circuit for receiving a output signal from the normal traveling detection section, and for using a pulse signal generated in vehicle traveling to reset the first or second flip-flop circuit delayed.

The invention further provides an emergency-brake lamp including an emergency-deceleration condition transducer provided with: an insulate house made of an insulate material, in which a close hollow arc groove is formed, said arc groove having an arc surface; some mercury is injected into said arc groove and changing with the vehicle traveling speed, said mercury in the arc groove can freely move along the arc surface; a plurality of metal contacts is provided on the said arc surface and led outside of said housing as leading out electrodes, the adjacent metal contacts being turned on and off successively when the mercury moves from one end contact to the other. A plurality of said metal contacts, according to their different positions on the arc surface in the arc groove, are divided into a normal traveling detection section, whose corresponding contacts send a on-off signal when the vehicle is normally traveling; an emergency braking detection section, whose corresponding contacts are turned on momentarily when emergency braking is applied; and a collision detection section, whose corresponding contacts are turned on momentarily when a vehicle collision accident occurs, and are continuously kept in a turning on state when an overturn accident occurs. The emergency-brake lamp also includes: a first flip-flop circuit for receiving a pulse output signal from the emergency braking detection section of said transducer, and for being flipped to output the emergency braking condition information when the pulse signal is detected; a second flip-flop circuit for receiving a output signal from the collision detection section of said transducer, and for being flipped to output the collision or overturn information when a collision or overturn signal is detected; a time delay circuit for locking, after the first or second flip-flop circuits is flipped, the state for a predetermined time; a pulse generating circuit for receiving a output signal from the normal traveling detection section, and for using a pulse signal generated in vehicle traveling to reset the first or second flip-flop circuit delayed; and a light source for emitting light to indicate the vehicle being in emergency braking condition or other emergency conditions by taggling said first flip-flop circuit to be flipped when the vehicle is in emergency braking condition or a collision or overturn accident occurs.

Said light source in the emergency brake lamp is preferably a high voltage xenon arc lamp, and includes a low frequency oscillating circuit and an oscillating boost rectifier circuit.

Said emergency brake lamp is preferably includes a radio transmitter-receiver.

Said emergency brake lamp can be mounted on the existing modern vehicles, and can indicate unambiguously the difference between the emergency braking, trouble emergency stopping and collision signals and normal deceleration signal in any environments and conditions, so as to make things convenient for others, protect oneself, and increase the view attraction of the warning signal and effective distance in bad environments. In addition, its starting and turning off are not restricted by the driver's faults and casualties, and all automatized, so as to effectively prevent the accident of vehicle striking from behind as well as serious collision events from occurring.

BRIEF DESCRIPTION OF DRAWINGS

The invention will be described in conjunction with the accompanying diagrams, in which:

FIGS. 1–3 and 7 are schematic diagrams of a structure of the emergency-deceleration transducer;

FIGS. 5 and 6 are circuit diagrams of the operation pricinple of the emergency brake lamp controlled by the emergency-deceleration transducer.

EMBODIMENTS OF INVENTION

Figure 1:
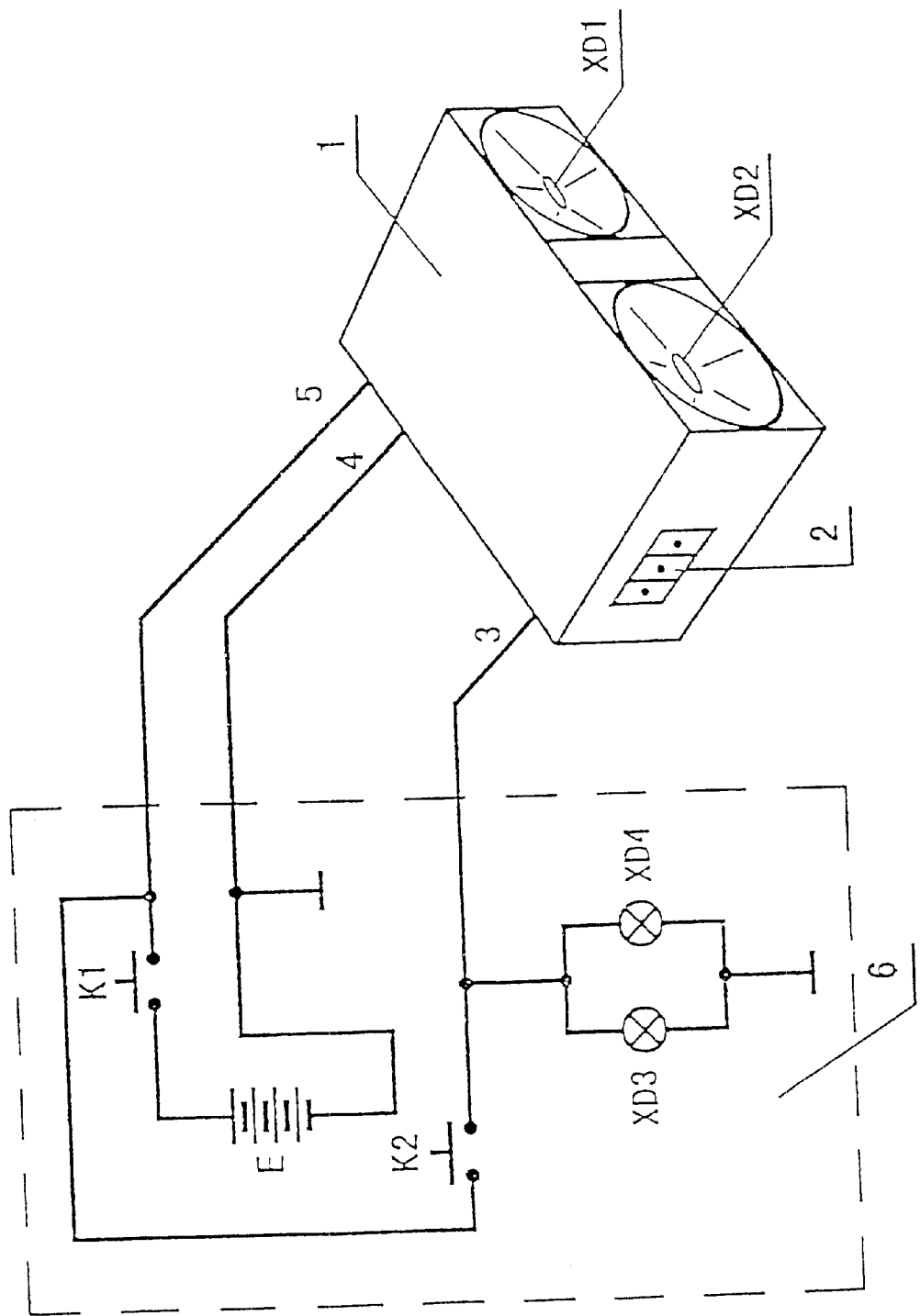
FIG. 1 is a wiring diagram of an emergency brake lamp and automobile circuit controlled by the emergency-deceleration transducer.

An emergency brake lamp 1, shown in FIG. 1 and controlled by an emergency-deceleration transducer, is mounted above the back row seats in the vehicle or on the tail of the vehicle. The lamp 1 has three input lines which are respectively used for a negative electrode 4, a positive electrode 5 and an emergency brake lamp light signal 3 which is realized by the flashing of the xenon arc lamps XD1, XD2. Output terminals 2 are function extension interfaces, which can be connected with an electronic apparatus such as a special radio transmitting-receiving warner. The dash lines show an automobile circuit 6, in which E is a battery, K1 a lock control power supply switch, K2 a brake lamp switch, and XD3, XD3 are brake tail lamps.

When a driver turns on the lock control switch K1 (i.e. the power supply switch on board), the emergency brake lamp1 controlled by the emergency-deceleration transducer enters into a monitoring condition. If K2 is closed, it means that the brake is being applied, and the xenon arc lamps XD1, XD2 each flash one time synchronously in order to serve as attracting the view. If the emergency braking or accident emergency stopping and colliding occurs, the internal emergency-deceleration transducer will automatically start the xenon arc lamps XD1, XD2 irrespective of the condition of k2, and the lamps will keep on emitting light till the vehicle restores travelling.

For vehicle colliding, besides light emitting, the terminals 2 further change the voltage output manner and make the outside connected electronic apparatus to alter its condition.

The structure and the operation pricinple of the emergency-deceleration transducer will be described in detail as follows.

Figure 2:
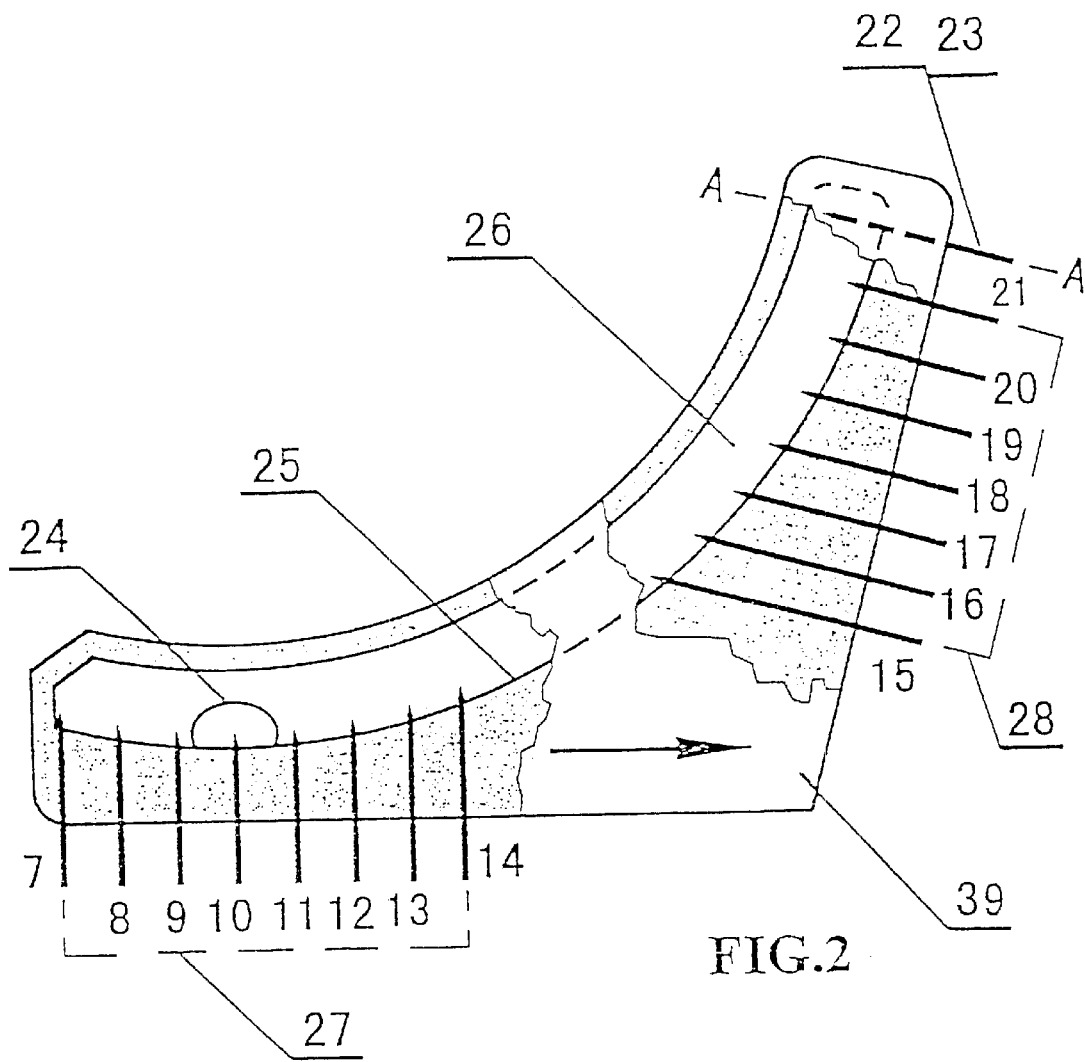
Figure 3:
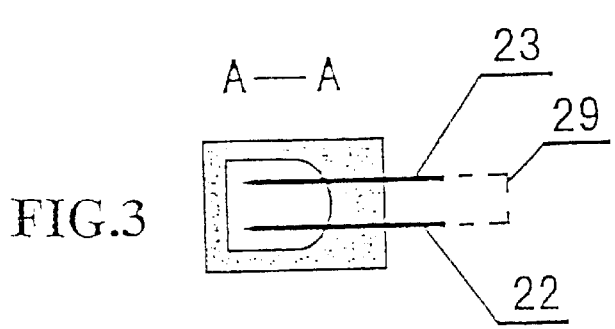

In an emergency-deceleration transducer 39 shown in FIGS. 2 and 3, mercury 24 is sealed in a hollow arc surface groove 26 insulated by a housing and 17 contacts 7–23 are provided along the upper and lower channel of an arc surface 25, wherein the lower row contacts 7–14 are refereed to as a normal travelling detection section 27, upper row contacts 15–21 are refereed to as an emergency brake detection section 28, and top contacts 22, 23 are refereed to as collision detection section 29.

The upper end of the emergency-deceleration transducer 39 is directed to the head of the vehicle (the arrow indicating the vehicle traveling direction), and the mercury 24 is rested at a proper position of contacts 7–14 and fixed. Once the traveling speed of the vehicle decrease dramatically, the mercury 24 will inertially rush at a place where any two contacts of the contacts 15–23 are connected to achieve the purpose of energizing and starting up the emergency brake lamp. Different sensitivity emergency brake characteristics are obtained by reasonably selecting a line connection pair of the contacts 15–23. When the accident vehicle restores traveling and changes its speed into normal traveling condition from starting and gear shifting, because the shock absorption characteristics of the front and rear wheels are not conformed with the uneven road surface, every link make mercury 24 generates a on-off signal between contacts 7~contacts 14, the purpose of turning off the emergency lamp is reached by processing the signal with a specific circuit.

In the present invention, the preferred realizing scheme is: the length of arc surface 25 is a ¼ arc of a diameter of 110 mm, the diameter of the mercury 24 is substantially equal to the width of the arc 25 and is 6 mm. The pitch of each contact of the normal travelling detection section 27 and the emergency brake detection section 28 is 5 mm, and the pitch between contacts 22 and 23 is 3 mm.

In mounting and applying, the highest contact 22 (or 23) and the lowest contact 10 preferably have an incline angle of 40 degree to the traveling direction.

Figure 4:
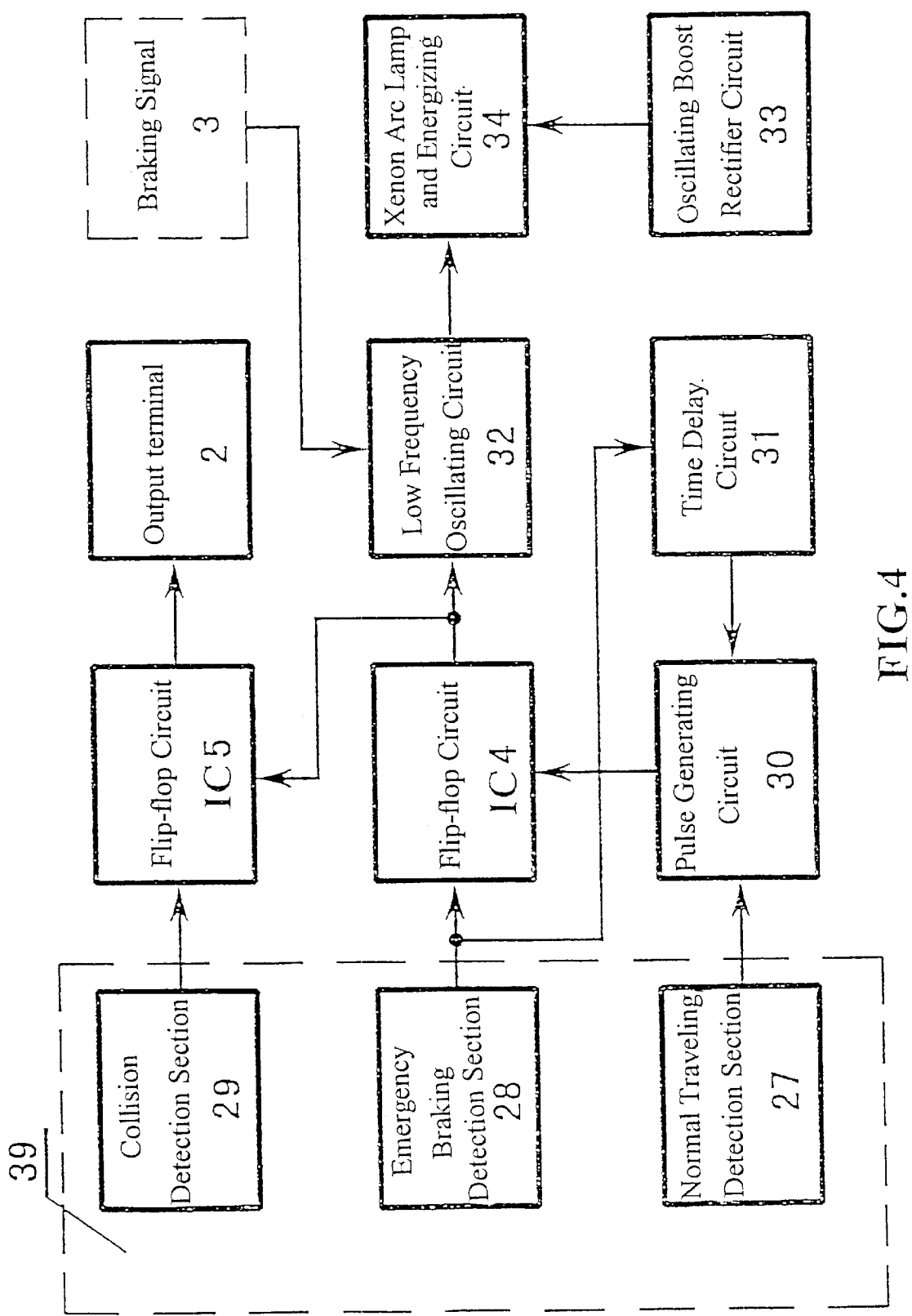
FIG. 4 is a block diagram of the operation pricinple of the emergency brake lamp controlled by the emergency-deceleration transducer.

Referring to block diagram of FIG. 4, the comprehensive description of the all principles of the invention will be performed.

An oscillating boost rectifier circuit 33 provides a xenon arc lamp and energizing circuit 34 with a high voltage DC power supply. Once the emergency brake detection section 28 in the emergency-deceleration transducer 39 sends a flipping signal, a flip-flop circuit IC4 outputs a high level, a low frequency oscillating circuit is controlled to start oscillating, and the xenon arc lamp and energizing circuit 34 flash uninterruptedly to respond to the oscillating and to indicate the emergency braking. At the same time, the emergency brake detection section 28 further controls a delay circuit 31 to lock temporarily a pulse generating circuit 30 for fifteen seconds. Although the vehicle is traveling by inertia at this time, during fifteen seconds the normal travelling detection section 27 can not reset and turn off the output of the flip-flop circuit IC4 by means of the pulse generating circuit 30, i.e. IC4 remains outputting a high level. If the vehicle is still traveling after fifteen seconds, the normal travelling detection section 27 allows the pulse generating circuit 30 to realize resetting and turning off instruction to the flip-flop circuit IC4. That means that IC4 remains outputting a low level and that the xenon arc lamp and energizing circuit 34 stops flashing. In contrary, if the vehicle is stationary completely in fifteen seconds after the emergency braking, then the xenon arc lamp and energizing circuit 34 remains flashing, till the vehicle restores travelling again.

If vehicle collision occurs, then the flip-flop circuit IC4 outputs a high level, a flip-flop circuit IC5 also outputs a high level (referring to FIGS. 2 and 3), and an output terminal 2 connected therewith changes the voltage outputting manner automatically. Similarly, in fifteen seconds after the vehicle collision, if the vehicle restores travelling again, then the resetting of IC4 forces IC5 to reset, and all circuits again enter into a warning condition.

The circuit principles of the invention are described in detail and completely as follows.

Figure 5:
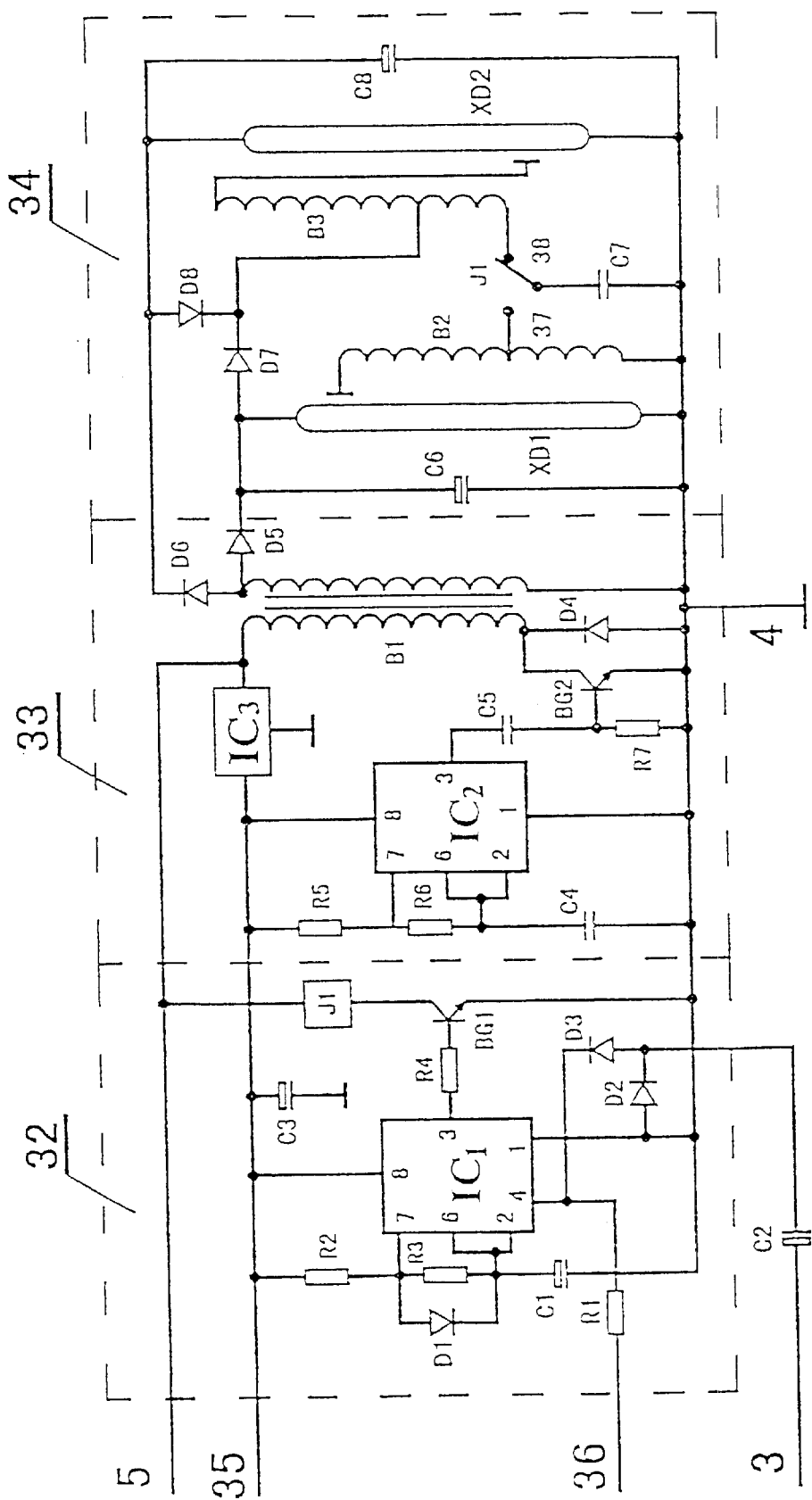

Refer to FIGS. 5 and 6, in which 5, 35, 36 and 3 are a complete diagram interconnected.

In FIGS. 5 and 6, IC3 is a three end voltage stabilizing integrate circuit, and IC1, IC2, IC4, IC5, IC6 are a flip-flop time base integrate circuit 555. In FIG. 5, IC2 of the oscillating boost rectifier circuit 33 and external elements constitute a time base oscillating circuit, and its operating process is as follows. The end 35 of IC3 voltage stabilizing output charges a capacitance C4 through resistances R5, R6. When the voltage of C4 rises to ⅔ of the voltage stabilizing value of end 35 of IC3, foot 6 of IC2 begins to be controlled and its foot 7 and foot 3 conduct to the ground. At this time, the capacitance C4 discharges through resistance R6 and foot 7, and when the voltage of C4 is reduced to ⅓ of the voltage stabilizing value of end 35 of IC3, foot 2 of IC2 is flipped, foot 3 jumps and becomes high level, foot 7 stops discharging, the capacitance C4 is charged through resistances R5, R6, and so repeatedly. Therefore, the base of a transistor BG2 obtains a series of high frequency signals, which are amplified by the transistor BG2 and then boosted up by a transformer B1. The voltage of 350 V output from the secondary coil of B1 is rectified through diodes D5, D6 and then supplied to the xenon arc lamp and energizing circuit 34.

The operating process of the xenon arc lamp and energizing circuit 34 in FIG. 5 is as follows. The high voltage DC electric energy from the oscillating boost rectifier circuit 33 is stored into the high capacity capacitances C6 and C8 as well as a low capacity capacitance C7, where C7 is an energizing capacitance. When a relay J1 moveable contact is turned off 38 and on 37, the capacitance C7 discharges to the primary coil of the transformer B2. This makes the secondary coil of the transformer B2 generate a high voltage of ten thousand volt acting on the xenon arc lamp XD1, and forces xenon to be ionized and become conductible. The capacitance C6 is discharged through the ionized xenon arc lamp XD1 to make it emit powerful light.

When the relay J1 moveable contact is reset to turn on 38, the capacitance C8 charges to the capacitance C7 through a diode D8 and the primary coil of a transformer B3. This makes the secondary coil of the transformer B3 generate a high voltage of ten thousand volt acting on the xenon arc lamp XD2, and forces xenon to be ionized and become conductible. The capacitance C8 is discharged through the ionized xenon arc lamp XD2 to make it emit powerful light.

A low frequency oscillating circuit 32 in FIG. 5 is connected as a time base circuit, and its starting oscillation is controlled by the potential value of foot 4, i.e. end 36. When end 36 is input at a high level, foot 4 of IC1 obtains a high level to start oscillation, and the operating process of the circuit is as follows. The end 35 of IC3 voltage stabilizing output charges a capacitance C1 through a resistance R2 and a diode D1. When the voltage of C1 rises to ⅔ of the voltage stabilizing value of end 35 of IC3, foot 6 of IC3 begins to be controlled and its foot 7 and foot 3 are conducted to the ground. At this time, the capacitance C1 is discharged through resistance R3 and foot 7, and when the voltage of C1 is reduced to ⅓ of the voltage stabilizing value of end 35 of IC3, foot 2 of IC2 is flipped. Its foot 3 is jumped and becomes a high level, while foot 7 stops discharging. The capacitance C1 is charged through the resistance R2 and the diode D1, and so repeatedly. Since the capacitance C1 is charged quicker and discharged slower (being charged through the diode D1 and discharged through the resistance R2, but R2<R3), this makes the relay J1 operate intermittently and a capacitance 7 of the circuit 34 be charged and discharged continually. Since the circuit 33 always supplies the circuit 34 with a high voltage DC power supply to compensate the loss of the capacitances C6 and C8, the circuit 34 will be flashed with the oscillation of the circuit 32, till foot 4 of IC1 obtains a low level.

In FIG. 5, because end 36 is generally in a low level, IC1 does not start oscillation. When the brake lamp switch K2 is closed (referring to FIG. 6 or FIG. 1), the end 3 becomes to be at a high level. At this time, the capacitance C2 is charged through the diode D3 and the resistance R1, and this makes the foot 4 of IC1 momentarily is at a high level. When the relay J1 is activated one time, that is, when braking artificially, the arc lamp XD1 and XD2 flash synchronically one time, only serving as a particular warning.

In FIG. 6, 30 is a pulse generating circuit, 31 a time delay circuit, 6 an external automobile circuit, and 2 an output terminal.

Their operating principle is as follows. Once the emergency brake action occurs, and the vehicle reduces its speed dramatically, the mercury 24 must rush forwards due to its inertia, and the foot 2 of IC4 is flipped to the ground, with its foot 3 supplying a high level to end 36. When the end 36 is at a high level, the foot 4 of IC1 obtains a high level to start oscillating, and the movable contact of the relay J1 turns on 37 and 38 alternatively to make XD1, XD2 flashed and emit an emergency braking signal.

While the mercury 24 flips the foot 2 of IC4 to the ground, the mercury 24 also makes a capacitance C11 of the time delay circuit 31 discharge one time through a diode D11. That is to say, if the capacitance C11 is required to restore to ⅔ of the voltage stabilizing value of the end 35, C11 needs to be charged for 15 seconds through the resistance R13. That means the foot 3 of IC6 remains at a high level for 15 seconds relatively, with a transistor BG5 grounding for 15 seconds to the base electrode of a transistor BG3 of the pulse generating circuit 30. Although the mercury 24 falls back quickly after the emergency braking, and the vehicle is still sliding shortly, the on-off signals of the mercury 24 on the contacts 7~14 can not be amplified and output temporarily by the transistor BG3. Only in 15 seconds, when the vehicle restores traveling and is still traveling, the on-off signals of the mercury 24 on the contacts 7~14 are allowed to be amplified and output by the transistor BG3, with the foot 4 of IC4 resetting to the ground. Only at this time, the end 36 is changed into a low level from a high level, and the arc lamps XD1, XD2 stop operating.

In FIG. 6, the operating principle of the pulse generating circuit 30 is as follows. When the mercury 24 conducts any two of the contacts 7~14, the power supply 5 is charged through a resistance R8, a capacitance C9 and the base of the transistor BG3. When the mercury 24 turns off two contacts, the capacitance C9 is discharged to a resistance R9 and a diode D9.

In the process of charging the capacitance C9, the transistor BG3 outputs a negative pulse to foot 4 of the resetting end of IC4, so that one process is completed for the end 36 to change to low potential from high potential.

The properties of the pulse generating circuit 30 are as follows. No matter the mercury 24 turns on or off any two of the contacts 7~14 for a long time, the transistor BG3 has no pulse output, and the pulses occurs continuously only when the mercury 24 alternatively turns on and off contacts frequently.

C10 is a resetting capacitance. At the moment when a lock controlling power supply switch K1 is turned on, the capacitance C10 forces the foot 4 of IC4 to be reset.

D10 is a resetting diode, it discharges the capacitance C10 quickly to make the resetting preparation for the next turning on when the lock controlling power supply switch K1 is turned off.

If a collision accident occurs, IC4 is flipped firstly, then the foot 2 is also flipped (referring to FIG. 7). The foot 3 of IC5 outputs a high level, and the relay J2 continues to operate. At this time, since the output terminal 2 alters the output operating manner, the operating condition of the external connecting apparatus is also changed.

Since the resetting end foot 4 of IC5 is connected with the output 3-foot end 36, IC5 must be reset as long as IC4 resets.

When a serious traffic accident occurs, the vehicle perhaps would roll and fall down a hillside. Since the mercury 24 rolls one time to discharge the capacitance C11 one time (i.e. extending 15 seconds further), the present invention never turns off the arc xenon lamp and its external connecting electronic apparatus, irrespective of the rolling time of the vehicle and its final posture.

The following is the types and the parameter values of the electronic elements in FIGS. 5 and 6, where the capacitance unit is micofarad.

R1 is of 5.1K, R2 of 27K, R3 of 56K, R4 of 220Ω, R5 of 240Ω, R6 of 9.1K, R7 of 6.8K, R8and R9 are of 3.9K, R10 is of 5.1K, R11 of 9.1K, R12 of 5.1K, R13 of 390K, R14 of 220Ω, R15 of 510Ω; C1 is of 22, C2 of 2.2, C3 of 470, C4 of 0.0068, C5 of 0.01, C6 and C8 are of 47/400V, C7 of 0.01/400V, C9 of 4.7, C10 of 2.2, C11 of 33, IC3 is L7806, IC1, IC2, IC4, and IC5 are NE555, J1 is 4100/12V, J2 is 4098/12V, D1, D2, D3, D9, D10, D11 are IN4001, the type of D4, D6, D5, D7 and D8 is RL202 (2KV, 2A), B1 is 12V/350V, B2 and B3 are a camera flashlight lamp energizing transformer, XD1 and XD2 are a camera flashlight tube, the type of BG1,BG3, BG4 and BG5 is C9014, BG2 is Darlington M715, and the power supply is a 12V storage battery.

The preferred embodiments of the invention have been described above in an exemplary manner, it should be understood that the present invention is not limited to the embodiments described above and that there may be various substitutes and alternations without departing from the spirits of the invention.

What is claimed is:

1. An emergency-deceleration condition signal control circuit comprising:
 (a) an emergency-deceleration condition transducer comprising:
  an insulation house made of an insulation material, in which a closed hollow arc groove is formed, said arc groove having an arc surface;
  a predetermined amount of mercury injected into said arc groove and changed with the vehicle traveling speed, said mercury being freely movable along said arc surface in said arc groove; and
  a plurality of metal contacts provided on the said arc surface and led outside of said housing as leading out electrodes, the adjacent metal contacts being turned on and off successively when the mercury is moved from one end contact to the other end contact of said arc surface, said plurality of metal contacts, according to their different positions on the arc surface in the arc groove, being divided into:
   a normal traveling detection section at the lower portion of said arc surface;
   an emergency braking detection section at the upper portion of said arc surface; and
   a collision detection section on the top of said arc surface;
 (b) a first flip-flop circuit used for receiving a pulse output signal from the emergency braking detection section of said transducer, and flipped for outputting the emergency braking condition information if the pulse signal is detected;
 (c) a second flip-flop circuit used for receiving an output signal from the collision detection section of said transducer, and flipped for outputting the collision or overturn information if a collision or overturn signal is detected;
 (d) a time delay circuit for locking the states of the first and second flip-flop circuits after flipped, for a predetermined time; and
 (e) a pulse generating circuit for receiving an output signal from the normal traveling detection section and for generating during vehicle traveling a pulse signal to reset said first and second flip-flop circuits after the delay times.

2. The emergency-deceleration condition signal control circuit according to claim 1, wherein said collision detection section comprises at least two contacts, which are kept on turning on continuously by the mercury when an overturn accident occurs.

3. The emergency-deceleration condition signal control circuit according to claim 1, wherein the length of said arc groove is about 8 to 35 times of the maximum diameter of the mercury along the longitudinal direction of said arc groove.

4. The emergency-deceleration condition signal control circuit according to claim 3, wherein the length of the arc groove is about 13 times of the maximum diameter of the mercury along the longitudinal direction of said arc groove.

5. The emergency-deceleration condition signal control circuit according to claim 1, wherein said metal contacts are arranged along the extension direction of said arc groove, in a single column.

6. The emergency-deceleration condition signal control circuit according to claim 5, wherein the number of said metal contacts is selected as 4 to 36.

7. The emergency-deceleration condition signal control circuit according to claim 6, wherein the number of said metal contacts is selected as 17.

8. The emergency-deceleration condition signal control circuit according to claim 1, wherein said metal contacts are arranged successively in multi-columns along the extension direction of said arc groove.

9. The emergency-deceleration condition signal control circuit according to claim 1,
 wherein said arc surface of said arc groove is set higher in the front and lower at the back along the vehicle traveling direction, and wherein a connection line between the highest metal contact and the lowest contact on said arc surface has an incline angle of about 15 to 60 degrees to the vehicle traveling direction.

10. The emergency-deceleration condition signal control circuit according to claim 9, said incline angle is about 40 degrees.

11. An emergency-brake lamp, comprising:
(a) an emergency-deceleration condition transducer comprising:
an insulation house made of an insulation material, in which a closed hollow arc groove is formed, said arc groove having an arc surface;
a predetermined amount of mercury injected into said arc groove and changed with the vehicle traveling speed, said mercury being freely movable along said arc surface in said arc groove; and
a plurality of metal contacts provided on said arc surface and led outside of said housing as leading out electrodes, adjacent metal contacts being turned on and off successively when said mercury is moved from one end contact to the other end contact of said arc surface, said plurality of metal contacts, according to their different positions on said arc surface in the arc groove, being divided into:
a normal traveling detection section at the lower portion of said arc surface;
an emergency braking detection section at the upper portion of said arc surface; and
a collision detection section on the top of said arc surface;
(b) a first flip-flop circuit used for receiving a pulse output signal from the emergency braking detection section of said transducer, and flipped for outputting the emergency braking condition information if the pulse signal is detected;
(c) a second flip-flop circuit used for receiving an output signal from the collision detection section of said transducer, and flipped for outputting the collision or overturn information if a collision or overturn signal is detected;
(d) a time delay circuit for locking the states of the first and second flip-flop circuits after flipped, for a predetermined time;
(e) a pulse generating circuit for receiving an output signal from the normal traveling detection section and for generating during vehicle traveling a pulse signal to reset said first and second flip-flop circuits after the delay time; and
(f) a light source for emitting light to indicate the vehicle being in an emergency braking condition or other emergency conditions when the vehicle is in an emergency braking condition or a collision accident as well as an overturn accident so as to make said first flip-flop circuit be flipped.

12. The emergency brake lamp according to claim 11,
wherein said light source is a high voltage xenon arc lamp and comprises a low frequency oscillating circuit and an oscillating boost rectifier circuit, and
whereby said light source is capable of emitting a certain frequency flashlight with a high strength to improve the warning effect.

13. The emergency brake lamp according to claim 11, further comprising a radio transmitter-receiver, controlled by the output signal of said second flip-flop circuit and issuing the collision or overturn warning information if said collision detection section detects a collision or overturn signal.

14. The emergency brake lamp according to claim 11, wherein said collision detection section comprises at least two contacts, which are kept on turning on continuously by the mercury when an overturn accident occurs.

15. The emergency brake lamp according to claim 11, wherein the length of said arc groove is about 8 to 35 times of the maximum diameter of the mercury along the longitudinal direction of said arc groove.

16. The emergency brake lamp according to claim 15, wherein the length of the arc groove is about 13 times of the maximum diameter of the mercury along the longitudinal direction of said arc groove.

17. The emergency brake lamp according to claim 11, wherein said metal contacts are arranged along the extension direction of said arc groove, in a single column.

18. The emergency brake lamp according to claim 17, wherein the number of said metal contacts is selected as 4 to 36.

19. The emergency brake lamp according to claim 18, wherein the number of said metal contacts is selected as 17.

20. The emergency brake lamp according to claim 11, wherein said metal contacts are arranged successively in multi-columns along the extension direction of said arc groove.

21. The emergency brake lamp according to claim 11,
wherein said arc surface of said arc groove is set higher in the front and lower at the back along the vehicle traveling direction, and
wherein a connection line between the highest metal contact and the lowest contact on said arc surface has an incline angle of about 15 to 60 degrees to the vehicle traveling direction.

22. The emergency brake lamp according to claim 21, said incline angle is about 40 degrees.

* * * * *